United States Patent
Doisy et al.

(10) Patent No.: US 6,314,053 B1
(45) Date of Patent: Nov. 6, 2001

(54) METHOD FOR DETECTING MOBILE OBJECTS WITH ACTIVE SONAR

(75) Inventors: Yves Doisy, Grasse Plascassier; Pierre Metivier, Villeneuve Loubet, both of (FR)

(73) Assignee: Thomson Marconi Sonar SAS, Sophia Antipolis (FR)

(*) Notice: Subject to any disclaimer, the term of this patent is extended or adjusted under 35 U.S.C. 154(b) by 0 days.

(21) Appl. No.: 09/674,505

(22) PCT Filed: May 7, 1999

(86) PCT No.: PCT/FR99/01091

§ 371 Date: Nov. 15, 2000

§ 102(e) Date: Nov. 15, 2000

(87) PCT Pub. No.: WO99/60418

PCT Pub. Date: Nov. 25, 1999

(30) Foreign Application Priority Data

May 15, 1998 (FR) .................................... 98 06179

(51) Int. Cl.⁷ ...................................... G01S 15/52
(52) U.S. Cl. .................. 367/90; 367/89; 367/91
(58) Field of Search .................. 367/87, 89, 90, 367/100, 91; 73/861.18, 861.25, 861.29

(56) References Cited

U.S. PATENT DOCUMENTS

Re. 35,535 * 6/1997 Brumley et al. ....................... 367/90
3,732,533 * 5/1973 Epstein et al. ....................... 367/90

FOREIGN PATENT DOCUMENTS

WO 93/16398   8/1993 (WO).

OTHER PUBLICATIONS

Henry Cox, et al., IEEE Comput. Soc. Press., vol. 2 pp. 1185–1189, "Geometric Comb Waveforms for Reverberation Suppression ", Oct. 31 to Nov.2, 1994.
Henry Cox, IEEE Comput. Soc. Press., vol. 2, pp. 1296–1299,, "Space–Time Processing for Suppression of Bottom Reverberation",Oct. 30 to Nov. 2, 1995.
Nihat M. Bilgutay, et al., Proceedings of the National Communications Forum, vol. 40, No. Part 2, pp. 1247–1252, "Frequency Agile Minimum Detector for Target Detection and Clutter Rejection", 1986.
Patent Abstracts of Japan , vol. 097, No. 010, Oct. 31, 1997, JP 09–159752, Jun. 20, 1997.

* cited by examiner

*Primary Examiner*—Ian J. Lobo
(74) *Attorney, Agent, or Firm*—Oblon, Spivak, McClelland, Maier & Neustadt, P.C.

(57) ABSTRACT

A process for making it possible to detect moving objects by an active sonar operating by the Dopper effect. The process uses, as a transmission signal, a burst of N pulses encoded so as to present a spectrum having a comb-of-lines structure. In this way, the "signal/reverberation" ratio of the useful signal intensity to the reverberated intensity is increased, thereby increasing the efficiency of the sonar. The process allows objects moving in a reverberating transmission medium to be detected more easily.

13 Claims, 4 Drawing Sheets

METHOD FOR DETECTING MOBILE OBJECTS WITH ACTIVE SONAR

BACKGROUND OF THE INVENTION

1. Field of the Invention

The present invention relates to processes for detecting moving underwater objects by means of an active sonar, comprising a directional antenna, by using the Doppler effect attached to the relative movement of the object and of the sonar and by forming directional channels on the basis of the signals from the transducers of the antenna.

2. Discussion of the Background

In order to detect a moving object, called, target a with a sonar, it is known practice to use the Doppler effect produced by the movement of the target. In such processes of the prior art, a pulse of narrow bandwidth compared with the Doppler shift from the target is transmitted, then on reception, the received signals are simultaneously correlated with several frequency-shifted copies of the transmitted pulse. Each correlation copy corresponds to a different possible Doppler shift. The best correlation is obtained with a copy having a frequency shift approximately equal to that caused by the movement of the target. Thus, the correlation by many copies and the use of the signals received make it possible to locate a target by distance and by azimuth and to calculate its radial velocity.

This process amounts to transmitting a bandwidth code which is narrower than the Doppler shift from the targets that one is seeking to detect. To do this, the transmission consists of a pulse of pure frequency $f_0$ and duration T, amplitude-weighted in order to reduce the level of the secondary lobes of the spectrum transmitted so as to obtain good spectral rejection. The spectral width of such a pulse is then about 4/T for a $\cos^2$ weighting.

It is known that the marine environment is reverberant, especially because of the many local heterogeneities (air bubbles, particles, plankton, etc.) forming scatterers. In addition, at shallow depths, the reverberation coming from the bottom and from the surface is significant. It follows that, when the spectrum of the reverberated signal and the spectrum of the copy are superimposed in the angular sector corresponding to the main lobe of the antenna, the detection performance is very poor.

FIG. 1 shows the value of the frequency f of the signal received as a function of the cosine of the angle $\theta$ between the velocity vector of the sonar carrier and the direction of a point in space in the bearing plane.

As the carrier moves with a uniform velocity V and as the transmitted frequency is $f_0$, it is known that the received frequency is given by $(1+2|V|/c \cos \theta)f_0$ where c is the speed of the acoustic waves in the water. The spread of the spectrum of the signal reverberated by the entire volume subjected to the sound is therefore represented by a sloping straight line 101 of width 4/T. As to the copy, this is independent of $\theta$ and is shown by a vertical straight line 102 of width 4/T.

The region denoted A corresponds to the reverberation case indicated above. In this region, the reverberated signal is received in the main receiving lobe 103. It is not removed either by the directivity, nor by the Doppler filtering.

The regions denoted B correspond to the case in which the spectrum of the reverberated signal and that of the copy are superimposed opposite the secondary lobes 104 of the receiving channel. There are therefore two contributions to the reverberated intensity detected. The first is that of the scatterers in the main lobe of the receiving channel, but at frequencies different from the target. These scatterers are rejected by spectral analysis. As the latter can reach 40 to 50 dB in sonar, this contribution can be ignored. A second contribution corresponds to the scatterers at the same frequency as the target, but attenuated by the secondary lobes of the directivity pattern. The situation in the figure shows the intersection 105 of the straight lines 101 and 102 with the secondary lobe 106.

The "reverberation/signal" ratio is given by the formula:

$$R.2\Delta\theta \frac{cT}{2} .10^{-\frac{NS}{10}} \qquad (1)$$

where R is the distance from the target and NS is the level in dB of the secondary lobes of the directivity pattern.

The angular interval $\Delta\theta$ corresponding to the spectral overlap between the copy and the reverberated signal is such that $\Delta \cos \theta = \lambda/VT$ and the ratio (1) does not depend on the duration T of the transmitted pulse: the fact of increasing this duration would not allow the performance to be increased.

The regions denoted C correspond to the case in which there is no scatterer at the frequency of the receiving channel. In this case, the performance is generally very good, but it only corresponds to a limited number of potential targets.

Patent application Ser. No. 92/01499, filed on Feb. 11, 1992 by the Thomson-CSF company and published on Aug. 13, 1993 under U.S. Pat. No. 2,687,226 describes a process for detecting moving targets in which a series of pulses at pure frequencies is transmitted. Its drawbacks stem from the fact that the performance in regions B remain poor and that the transmitted frequencies depend on the speed of the target.

SUMMARY OF THE INVENTION

In order to be able to obtain good performance equally in the A and B regions, while retaining the performance of the C regions, the invention proposes a process for detecting moving objects by an active sonar moving at a velocity V, in which a signal of duration T is transmitted, which signal is reverberated by the transmission medium, presenting a spectral spread due to the actual speed of the sonar and this reverberated signal is processed by correlation with a set of the frequency-shifted copies of the transmission signal in order to correspond to the set of Doppler shifts capable of affecting the reverberated signal, mainly characterized in that the transmitted signal is broadband encoded in order to present a spectrum having a comb-of-lines structure at successive frequencies $f_i$, the interval separating two successive lines $f_i$ and $f_{i+1}$ of which is a function of the velocity V in order to be at least equal to the spectrum spread by satisfying the formula:

$$\left(1 - \frac{2V}{c}\right)f_{i+1} - \frac{a}{T} \geq \left(1 + \frac{2V}{c}\right)f_i + \frac{a}{T}$$

where a is an integer between 1 and 2.

According to another characteristic, the encoded signal is formed by N pulses, each of which occupies a frequency band B centered on a frequency $f_0$, where N is greater than or equal to:

$$N \cong \frac{4VT}{c}\left(f_0 + \frac{B}{2}\right).$$

According to another characteristic, the transmission signal furthermore comprises two pulses at pure frequences $f_m$ and $f_M$ intended to make it possible to detect fast moving objects, the echoes from which are located beyond the frequency band occupied by the reverberated signal both when receding and when approaching, these frequencies being given by the equations:

$$\left(1 + \frac{2V}{c} + \frac{2|V_c^{max}|}{c}\right)f_m + \frac{2}{T} \leq \left(1 - \frac{2V}{c}\right)f_1 - \frac{2}{T} \quad \text{and}$$

$$\left(1 + \frac{2V}{c}\right)f_1 + \frac{2}{T} \leq \left(1 - \frac{2V}{c} + \frac{2|v_c^{max}|}{c}\right)f_M - \frac{2}{T}.$$

According to another characteristic, in order for the moving objects, whose speed is approximately equal to one of the blind speeds of the broadband encoded signals, to be detected by the pure-frequency signals, the frequencies $f_m$ and $f_M$ are chosen to satisfy, in addition, the equations:

$$f_M = q\frac{N}{T} \quad \text{and} \quad f_m = \left(p \pm \frac{\Delta}{2}\right)\frac{N}{T}$$

where $\Delta$ corresponds to the smallest interval separating the arithmetic series of the p/q ratio from the series of integers.

According to another characteristic, a process is used in which $f_m$ and $f_M$ are chosen so as to satisfy the equations:

$$\begin{cases} \left(1 + \frac{2V}{c}\right)f_1 + \frac{2}{T} \leq \left(1 - \frac{2V}{c} - \frac{2|V_c^{max}|}{c}\right)f_m - \frac{2}{T} \\ \left(1 + \frac{2V}{c}\right)f_1 + \frac{2}{T} \leq \left(1 - \frac{2V}{c} - \frac{2|V_c^{max}|}{c}\right)f_M - \frac{2}{T} \end{cases}$$

According to another characteristic, a process is used in which $f_m$ and $f_M$ are chosen so as to satisfy the equations:

$$\begin{cases} \left(1 + \frac{2V}{c} + \frac{2|V_c^{max}|}{c}\right)f_m + \frac{2}{T} \leq \left(1 - \frac{2V}{c}\right)f_M - \frac{2}{T} \\ \left(1 + \frac{2V}{c} + \frac{2|V_c^{max}|}{c}\right)f_M + \frac{2}{T} \leq \left(1 - \frac{2V}{c}\right)f_1 - \frac{2}{T} \end{cases}$$

According to another characteristic, a towed linear acoustic antenna is used to receive the reverberated signals.

BRIEF DESCRIPTION OF THE DRAWINGS

Other particular features and advantages of the invention will become clearly apparent in the following description, presented by way of nonlimiting example, with reference to the appended figures which show.

DESCRIPTION OF THE PREFERRED EMBODIMENTS

The invention proposes to use encoded signals according to codes for which the spectrum has a so-called called comb-of-lines structure.

Figure 1:
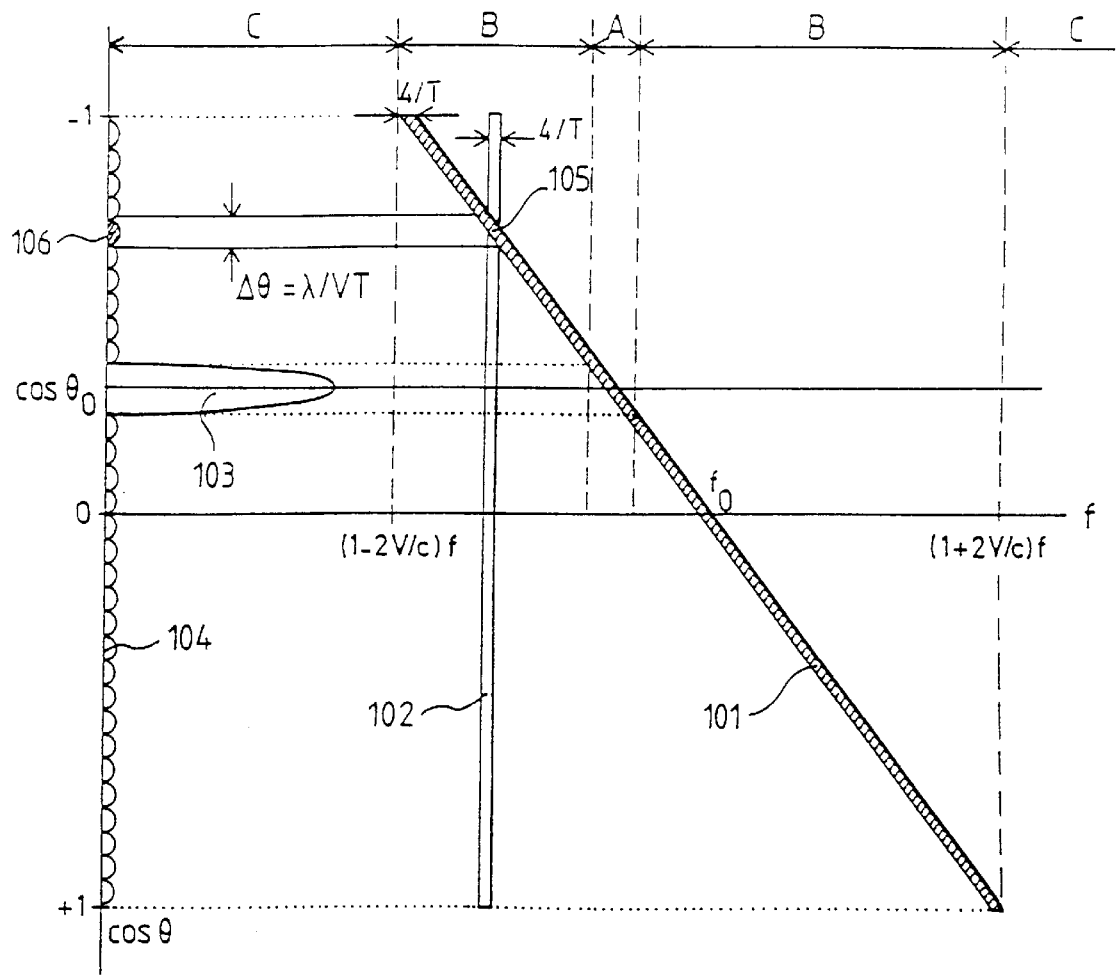
FIG. 1, a frequency/direction diagram for a signal transmitted at a pure frequency.
Figure 2:
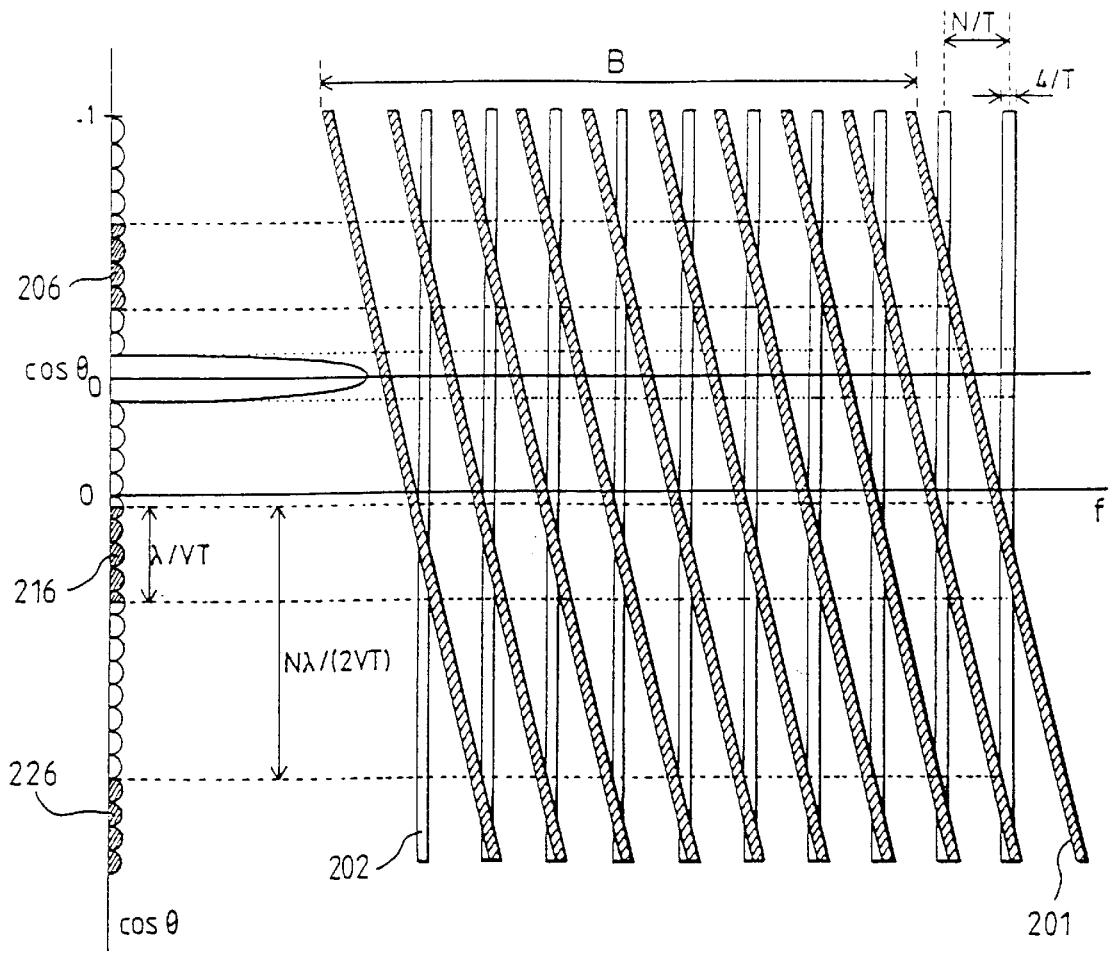
FIG. 2, a diagram similar to that of FIG. 1, but corresponding to a burst of N signals.

Such a structure can be obtained by transmitting a periodic broadband signal, or by direct synthesis in the spectral domain. Let us suppose, for example, that the transmitted code consists of N identical $\cos^2$-weighted "subcodes" or broadband (FM, BPSK or other) "elementary patterns", each one of duration T/N, the whole sequence being amplitude-weighted over the duration T. Its spectrum, shown in a frequency/direction diagram as in FIG. 1, will then have the appearance shown in FIG. 2. The comb-of-lines 201, each one of width 4/T (between the first zeroes), separated by N/T, and having a strong spectral rejection between the lines, can be seen. The set of lines covers a bandwidth B.

By considering a copy 202, shifted in frequency for detection, many angular directions 206, 216, 226 contributing to the cross spectrum between the copy and the reverberation are found in region B. By taking as variable $u = \cos\theta$, these various directions are separated by $N\lambda/2VT$. As the variable u varies from −1 to +1, the number of these directions is given by the formula:

$$M = \frac{4VT}{N\lambda} \quad (2)$$

In this region B, the ratio of the reverberated intensity to the transmitted energy is approximately equal to:

$$R\frac{4V_c^{max}T}{\lambda}\lambda\theta_0\frac{c}{2B} \cdot 10^{\frac{-N_s}{10}} \quad (3)$$

where:

$V_c$=radial velocity of the target $\Delta\theta_0$=angular interval of overlap of the spectra.

This formula is valid when $V_c^{Max} \geq 2V$, which is almost always the case in practice.

If this formula is compared to formula (1), which was set up for the pure-frequency mode called "PF" mode, a performance gain G is obtained, equal to:

$$G = \frac{cB}{2V_c^{Max}f_0} \quad (4)$$

With a bandwidth equal to one third of the carrier frequency and a velocity $V_c^{Max}$=30 knots, a gain of 9.2 dB is obtained. The gain is lower, the higher the velocity $V_c^{Max}$. If $V_c^{Max} < 2V$, the value of G is $$\frac{cB}{4Vf_0}$$

Thus, for V=10 knots and $B/f_0$=1/3, G=14 dB.

The invention therefore proposes to use a comb-of-lines broadband code matched to the velocity of the carrier, independently of the speed of the target.

Figure 3:
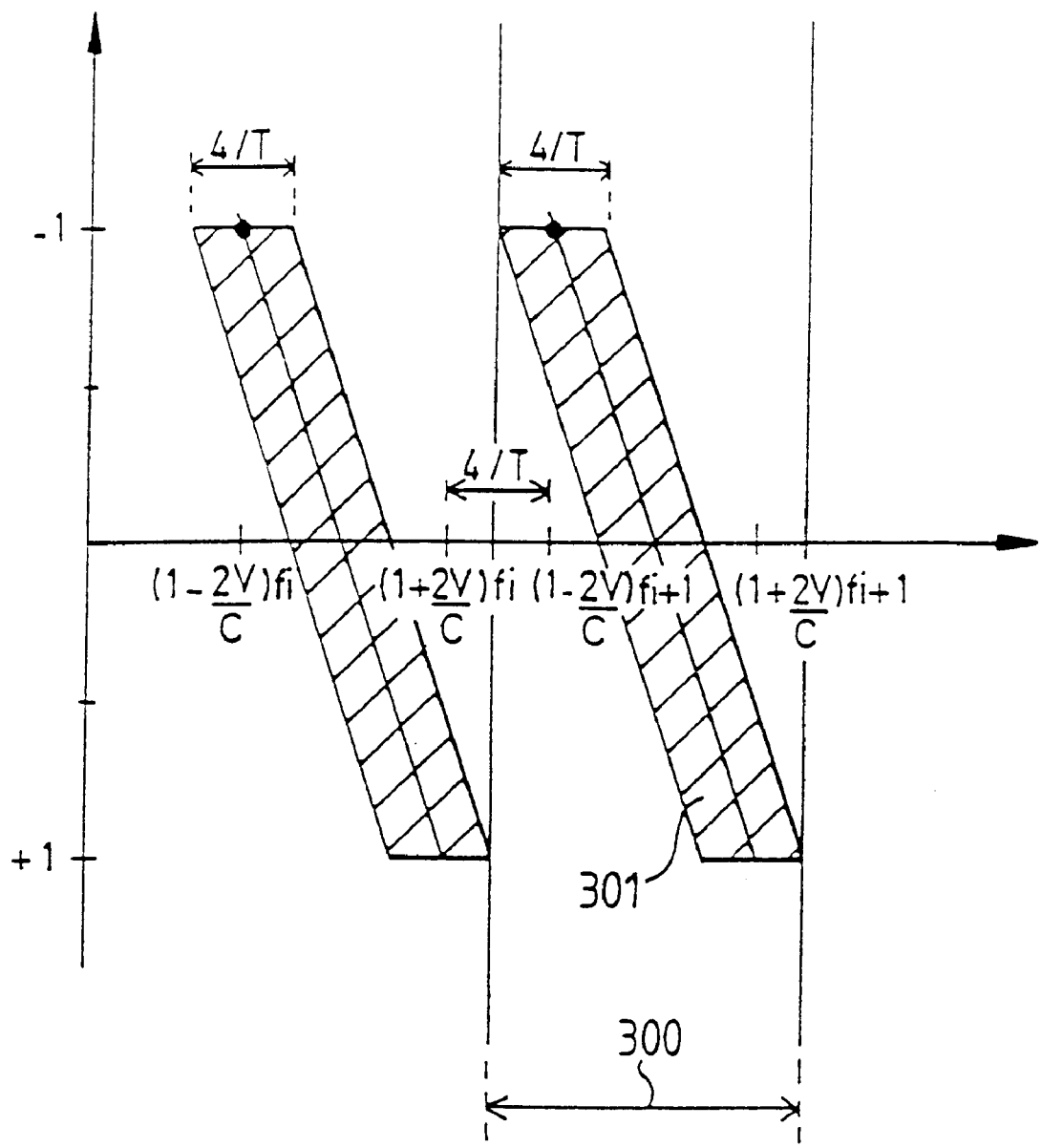
FIG. 3, a similar diagram corresponding to the transmission at two pure frequencies.

This broadband code, of duration T and of bandwidth B, is such that the spacing between each line of its spectrum is equal to the reverberation frequency spread associated with the line originating solely from the velocity V of the carrier, as shown in FIG. 3, where the width of the pulses 301 has been exaggerated compared to the variation interval 300 of the copy.

For 2 adjacent lines, this condition can be written:

$$\left(1 - \frac{2V}{c}\right)f_{i+1} \geq \left(1 + \frac{2V}{c}\right)f_i + \frac{4}{T} \quad (5)$$

Figure 4:
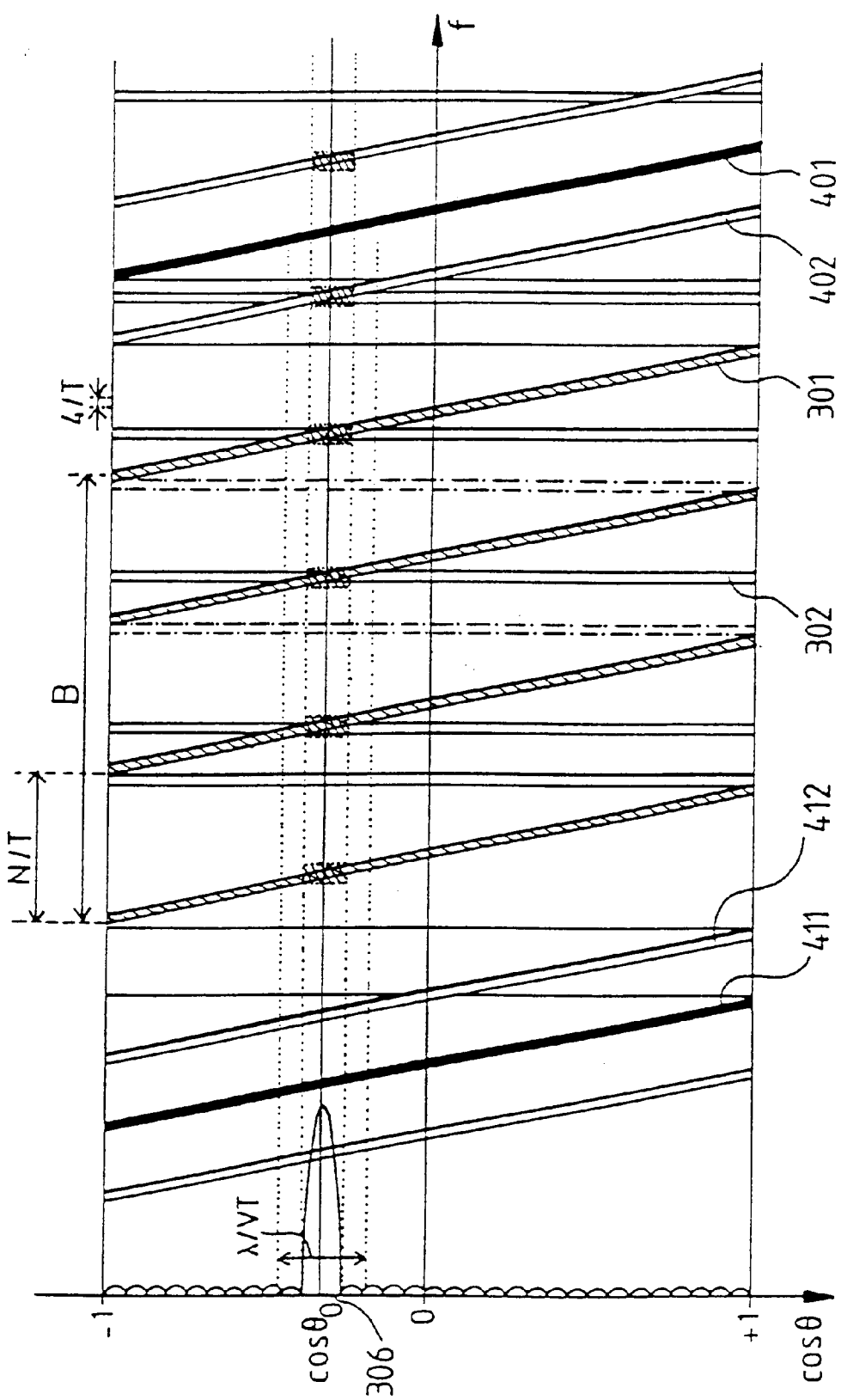
FIG. 4, a diagram similar to that of FIG. 2, of N signals transmitted in accordance with the invention.

The diagram of the cos θ direction as a function of frequency under these conditions is shown in FIG. 4. Note that a single reverberation direction 306 contributes to the cross spectrum.

The broadband code used is composed of N pulses each having a band width B centered on the frequency $f_0$. The interval between 2 adjacent lines is such that $f_{i+1} - f_i = N/T$. By taking the least favorable case, the following is obtained using formula (5).

$$N \geq 4\left[\frac{VT}{c}\left(f_0 + \frac{B}{2}\right) + 1\right] \quad (6)$$

The optimum situation is obtained for the equality.
In order to control the secondary loads of the transmitted spectrum, this number will preferably be greater than a minimum number, equal, for example, to 12. This condition then corresponds to carrier velocities meeting the condition:

$$V \geq \frac{2C}{Tf_0} \quad (7)$$

For the sake of simplification, this value of N=12 will be kept for lower speeds.

In formula (5), i varies from 1 to a maximum value given by:

$$i_{max} = I = E\left(\frac{BT}{N} + 1\right) \quad (7)$$

where E means "integer part".
Corresponding to these 2 values are the 2 frequencies $$f_0 - \frac{B}{2} \text{ and } f_0 + \frac{B}{2}.$$

The processing on receiving this broadband code can be carried out conventionally by correlation with copies which correspond to all the possible "Doppler targets".

By simplifying formula (6) to:

$$N \cong \frac{4VT}{c}\left(f_0 + \frac{B}{2}\right)$$

the gain G obtained in region B compared with the PF mode is given by the formula:

$$G = \frac{BT}{N}\left(1 + \frac{B}{2f_0}\right) \text{ for } V_c^{max} < 2V \quad (8)$$

and by the formula $$G = 2\frac{BT}{N}\left(1 + \frac{B}{2f_0}\right)\frac{V}{V_c^{max}} \text{ for } V_c^{max} \geq 2V. \quad (9)$$

In a preferred embodiment, the invention proposes to use two conventional codes, PF 401 and 411, each with the same energy as the broadband code, whose frequencies are located symmetrically with respect to the spectrum of the broadband code.

The frequencies $f_m$ and $f_M$ of these two codes are determined in such a way as to detect the target, by one of the two codes, as soon as the target is in the region C.

In order to do this, $f_m$ and $f_M$ must satisfy the following inequalities:

$$\left(1 + \frac{2V}{c} + \frac{2|V_c^{max}|}{c}\right)f_m + \frac{2}{T} \leq \left(1 - \frac{2V}{c}\right)f_1 - \frac{2}{T} \quad (10)$$

and $$\left(1 + \frac{2V}{c}\right)f_I + \frac{2}{T} \leq \left(1 - \frac{2V}{c} - \frac{2|V_c^{max}|}{c}\right)f_M - \frac{2}{T} \quad (11)$$

The reception processing of these 2 codes will be identical to that of the broadband code, i.e. correlation with copies 402 and 412 which correspond to the "Doppler targets" in the C regions (approaching in the case of the $f_M$ code, receding in the case of the $f_m$ code).

The targets, for which the radical velocity $V_r$ satisfies equation:

$$\frac{2|V_r|}{c}f_0 = k\frac{N}{T} \quad (12)$$

where k is an integer, reflect a signal whose spectrum coincides with that of the reverberation in the direction of the target, and therefore lie in region A, with very little chance of being detected. This corresponds, as in any Doppler system, to blind frequencies.

However, these blind velocities correspond in all cases, taking into account the frequency spacing chosen for the broadband code, to targets in region C (the worst cases correspond to a target coming from the rear with a radial velocity of 2V, or a target coming from the front with a radial velocity of −2V). It is therefore possible, according the invention, to treat them with PF codes.

The performance in region C is therefore that of the PF mode, on condition that the spectra of the various codes are separated sufficiently to be able to ignore the mutual interactions.

In particular, for the "burst" codes, the various lines occupy the positions kN/T where k is an integer, and for certain elementary patterns (FM code for example), the decrease in the level of these lines is quite slow, so that the reverberation produced by the transmission of the broadband code in the PF copy can become a problem. This is particularly so when the spectrum of the PF copy intercepts one of the spectral lines of the reverberation associated with the broadband code opposite the main lobe of the channel pointing at the target. This corresponds to a condition given by the formula:

$$\left(1 + \frac{2V}{c}\cos\theta_0\right)k\frac{N}{T} = \left(1 + \frac{2V}{c}\cos\theta_0 + \frac{2V_r}{c}\right)f_m \quad (13)$$

for low PF, or $$\left(1 + \frac{2V}{c}\cos\theta_0\right)k'\frac{N}{T} = \left(1 + \frac{2V}{c}\cos\theta_0 + \frac{2V_r}{c}\right)f_M \quad (14)$$

for high PF.

As the value of $$\frac{2V}{c}\cos\theta_0$$

is small compared with 1, to a first order these equations become:

$$\left(1 + \frac{2Vr}{c}\right)f_m = k\frac{N}{T} \quad (15)$$

$$\left(1 + \frac{2Vr}{c}\right)f_M = k'\frac{N}{T} \quad (16)$$

The 2 conditions (13) and (14) can occur simultaneously, which means that detection of the target by one of the 2 PF codes in region C is therefore not ensured.

In order to remedy this, it is possible to set the frequency values to $$f_M = q\frac{N}{T} \text{ and } f_m = p\frac{N}{T} + \delta\frac{N}{T}$$

where q and p are integers.
The value of δ is then such that $$\delta = \pm\frac{\Delta}{2},$$

where Δ corresponds to the smallest interval separating the arithmetic series of the p/q ratio from the series of integers.

Thus targets having a Doppler shift of less than N/T in absolute value will be detected by the broadband code, and other targets will be detected by one of the PF codes.

However the invention still operates, but with degraded performance, when only one of these 2 pure frequencies is used.

In one embodiment, a sonar with a towed linear antenna whose bandwidth available at transmission Δf=600 Hz is centered on $f_0$=1500 Hz, and which moves at the velocity of V=4 m/s, was produced. The energy transmitted corresponds to codes of duration T=8 s, the sound level and the desired carriers being taken into account.

As the band B is less than Δf, N can be obtained from (6). Therefore N=157.6, from which N/T=19.7 Hz which can be rounded up to 20 Hz. Thus the broadband code is formed from 160 pulses each of 50 ms duration.

For the PF codes, $f_M$=1800 Hz so q=90. Therefore $f_m$=1203.33 Hz, p=60, p/q=2/3 and Δ=1/3. From this it can be deduced that $f_m$=1203.33 Hz.

The inequalities (10) and (11) lead to $f_1$=63×20=1260 Hz and $f_1$=87×20=1740 Hz. Each pulse of the broadband code therefore has a band equal to 480 Hz.

The transmission of such a sonar can therefore be formed:
by a first amplitude-weighted PF code, of duration T=8 s (from 0 to T) and of frequency $f_m$=1260 Hz;
by an amplitude-weighted broadband code, of duration T=8 s (from T/2 to 3T/2) consisting of N=160 pulses of duration 50 ms and of bandwith B=480 Hz centered on 1500 Hz;
by a second amplitude-weighted PF code, of duration T=8 s (from T2 to T) and of frequency $f_M$=1800 Hz.

At reception, the following processing is then carried out:
formation of channels;
in each channel formed, matched filtering, the nature of the copies of which depends on the frequency interval in question;

for the radial velocities $V_r$ of the targets, such that:

$$-\frac{N}{T} \leq \frac{2V_r}{c}f_i \leq \frac{N}{T} \quad (18)$$

the copies are generated by carrying out a Doppler shift of the broadband transmitted code with the Doppler parameters corresponding to the interval 2N/T;
for the other velocities $V_r$, such that $$\frac{2|V_r|}{c}f_i > \frac{N}{T} \quad (19)$$

the copies are generated by Doppler shift of the frequencies $f_m$ and $f_M$ with the corresponding Doppler parameters.

The matched filtering of the received signal is carried out simultaneously with all the copies thus generated and the known detection and normalization processes of the prior art are applied.

As a variant, the broadband code can be synthesized directly using the following formula:

$$e(t) = \sum_{i=0}^{I} a_i\cos(2\pi f_i t + \phi_i)env\left(\frac{t}{T}\right) \quad (20)$$

in which:

$$\left(1 - \frac{2V}{c}\right)f_{i+1} = \left(1 + \frac{2V}{c}\right)f_i + \frac{4}{T} \quad (21)$$

$$\text{with } i = 1; \quad i_{\max} = E\left(\frac{BT}{N} + 1\right)$$

In these formulae, the terms $(a_i, \phi_i)$ are optimized so that the code has a constant energy between 0 and T. The term env(x) is the nonzero amplitude weighting from 0 to T.

It is also possible to choose to bring together the PF frequencies from the same side of the broadband code spectrum. The conditions then become:

$$\begin{cases} \left(1 + \frac{2V}{c}\right)f_1 + \frac{2}{T} \leq \left(1 - \frac{2V}{c} - \frac{2|V_c^{\max}|}{c}\right)f_m - \frac{2}{T} & (22) \\ \left(1 + \frac{2V}{c}\right)f_m + \frac{2}{T} \leq \left(1 - \frac{2V}{c} - \frac{2|V_c^{\max}|}{c}\right)f_M - \frac{2}{T} & (23) \end{cases}$$

or $$\begin{cases} \left(1 + \frac{2V}{c} + \frac{2|V_c^{\max}|}{c}\right)f_m + \frac{2}{T} \leq \left(1 - \frac{2V}{c}\right)f_M - \frac{2}{T} & (24) \\ \left(1 + \frac{2V}{c} + \frac{2|V_c^{\max}|}{c}\right)f_M + \frac{2}{T} \leq \left(1 - \frac{2V}{c}\right)f_1 - \frac{2}{T} & (25) \end{cases}$$

What is claimed is:
1. A process for detecting moving objects by an active sonar moving at a velocity V, in which a signal of duration T is transmitted, which signal is reverberated by the transmission medium, having a spectral spread due to the actual speed of the sonar and this reverberated signal is processed by correlation with a set of frequency-shifted copies of the transmission signal in order to correspond to the set of Doppler shifts capable of affecting the reverberated signal, characterized in that the transmitted signal is broadband encoded in order to present a spectrum having a comb-of-lines structure at successive frequencies $f_i$, the interval separating two successive lines $f_i$ and $f_{i+1}$ of which is a function of the velocity V in order to be at least equal to the spectrum spread by satisfying the formula:

$$\left(1 - \frac{2V}{c}\right)f_{i+1} - \frac{a}{T} \geq \left(1 + \frac{2V}{c}\right)f_i + \frac{a}{T}$$

where a is an integer between 1 and 2, c is the speed of acoustic waves in water and in that the transmission signal also comprises two pulses at pure frequencies $f_m$ and $f_M$ intended to make it possible to detect fast moving objects, the echoes from which are located beyond the frequency band occupied by the reverberated signal, both when receding and when approaching, these frequencies being given by the equations:

$$\left(1 + \frac{2V}{c} + \frac{2|V_c^{max}|}{c}\right)f_m + \frac{2}{T} \leq \left(1 - \frac{2V}{c}\right)f_1 - \frac{2}{T} \quad \text{and}$$

$$\left(1 + \frac{2V}{c}\right)f_1 + \frac{2}{T} \leq \left(1 - \frac{2V}{c} + \frac{2|v_c^{max}|}{c}\right)f_M - \frac{2}{T}.$$

where $V_c^{max}$ is the maximum velocity of the target.

2. The process as claimed in claim 1, characterized in that the encoded signal is formed by N pulses, each of which occupies a frequency band B centered on a frequency $f_0$, where N is greater than or equal to:

$$N \cong \frac{4VT}{c}\left(f_0 + \frac{B}{2}\right).$$

3. The process as claimed in claim 1, characterized in that, in order for the moving objects, whose speed is approximately equal to one of the blind speeds of the broadband encoded signals, to be detected by the pure-frequency signals, the frequencies $f_m$ and $f_M$ are chosen to satisfy, in addition, the equations:

$$f_M = q\frac{N}{T} \quad \text{and} \quad f_m = \left(p \pm \frac{\Delta}{2}\right)\frac{N}{T}$$

where $\Delta$ corresponds to the smallest interval separating the arithmetic series of the p/q ratio from the series of integers.

4. The process as claimed in claim 1, in which $f_m$ and $f_M$ are chosen so as to satisfy the equations:

$$\begin{cases} \left(1 + \frac{2V}{c}\right)f_1 + \frac{2}{T} \leq \left(1 - \frac{2V}{c} - \frac{2|V_c^{max}|}{c}\right)f_m - \frac{2}{T} \\ \left(1 + \frac{2V}{c}\right)f_m + \frac{2}{T} \leq \left(1 - \frac{2V}{c} - \frac{2|V_c^{max}|}{c}\right)f_M - \frac{2}{T}. \end{cases}$$

5. The process as claimed in claim 1, in which $f_m$ and $f_M$ are chosen so as to satisfy the equations:

$$\begin{cases} \left(1 + \frac{2V}{c} + \frac{2|V_c^{max}|}{c}\right)f_m + \frac{2}{T} \leq \left(1 - \frac{2V}{c}\right)f_M - \frac{2}{T} \\ \left(1 + \frac{2V}{c} + \frac{2|V_c^{max}|}{c}\right)f_M + \frac{2}{T} \leq \left(1 - \frac{2V}{c}\right)f_1 - \frac{2}{T}. \end{cases}$$

6. The process as claimed in claim 1, characterized in that a towed linear acoustic antenna is used to receive the reverberated signals.

7. The process as claimed in claim 2, characterized in that, in order for the moving objects, whose speed is approximately equal to one of the blind speeds of the broadband encoded signals, to be detected by the pure-frequency signals, the frequencies $f_m$ and $f_M$ are chosen to satisfy, in addition, the equations:

$$f_M = q\frac{N}{T} \quad \text{and} \quad f_m = \left(p \pm \frac{\Delta}{2}\right)\frac{N}{T}$$

where $\Delta$ corresponds to the smallest interval separating the arithmetic series of the p/q ratio from the series of integers.

8. The process as claimed in claim 2, in which $f_m$ and $f_M$ are chosen so as to satisfy the equations:

$$\begin{cases} \left(1 + \frac{2V}{c}\right)f_1 + \frac{2}{T} \leq \left(1 - \frac{2V}{c} - \frac{2|V_c^{max}|}{c}\right)f_m - \frac{2}{T} \\ \left(1 + \frac{2V}{c}\right)f_m + \frac{2}{T} \leq \left(1 - \frac{2V}{c} - \frac{2|V_c^{max}|}{c}\right)f_M - \frac{2}{T}. \end{cases}$$

9. The process as claimed in claim 2, in which $f_m$ and $f_M$ are chosen so as to satisfy the equations:

$$\begin{cases} \left(1 + \frac{2V}{c} + \frac{2|V_c^{max}|}{c}\right)f_m + \frac{2}{T} \leq \left(1 - \frac{2V}{c}\right)f_M - \frac{2}{T} \\ \left(1 + \frac{2V}{c} + \frac{2|V_c^{max}|}{c}\right)f_M + \frac{2}{T} \leq \left(1 - \frac{2V}{c}\right)f_1 - \frac{2}{T}. \end{cases}$$

10. The process as claimed in claim 2, characterized in that a towed linear acoustic antenna is used to receive the reverberated signals.

11. The process as claimed in claim 3, characterized in that a towed linear acoustic antenna is used to receive the reverberated signals.

12. The process as claimed in claim 4, characterized in that a towed linear acoustic antenna is used to receive the reverberated signals.

13. The process as claimed in claim 5, characterized in that a towed linear acoustic antenna is used to receive the reverberated signals.

* * * * *